3,549,730
PROCESS FOR PREPARING
TRIARYLPHOSPHATES
Bush Y. Abadir, Moraga, Calif., and Mark E. Mayberry, Affton, Mo., assignors to Monsanto Company, St. Louis, Mo., a corporation of Delaware
No Drawing. Continuation-in-part of application Ser. No. 341,418, Jan. 30, 1964. This application Aug. 16, 1967, Ser. No. 660,942
Int. Cl. C07f 9/12; C08f 45/50
U.S. Cl. 260—975   5 Claims

ABSTRACT OF THE DISCLOSURE

An improved process for preparing triarylphosphates, useful as oil additives and plasticizers, which utilizes acid-activated clay of the montmorillonite type to catalyze the reaction.

---

This application is a continuation-in-part of copending application Ser. No. 341,418, filed Jan. 30, 1964, now abandoned.

This invention relates to an improved process for making triarylphosphates. More particularly, this invention is concerned with a catalytic process for making triarylphosphates by employing, as a catalyst, an activated clay which is physically separable from the desired reaction product.

The phosphates which are prepared by the use of the novel catalytic process of this invention have the formula,

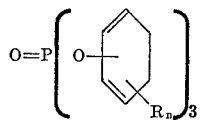

where R is hydrogen or alkyl having from 1 to 4 carbon atoms, and $n$ is an integer from 0 to 3, the catalytic material being non-reactive with respect to the phosphorus oxyhalide under the reaction conditions employed.

The production of triarylphosphates, as heretofore carried out, involves the reaction of phenols, including alkyl phenols, with phosphorus oxychloride in the presence of a catalyst such as aluminum chloride or magnesium chloride. After the reaction is completed, the excess phenol and the triarylphosphate are recovered by distillation and the residue discarded. This, of course, involves loss of reactants, reaction product and catalyst in the residue with consequent reduction in yield and high operational expenses. Alternatively, it has been proposed to decompose and remove the catalyst prior to subjecting the reaction mixture to distillation or other purification techniques. In this alternative procedure also, the catalyst is lost. Moreover, in both such procedures, to obtain maximum recovery of triarylphosphate product, the distillation must be carried out at high temperatures and low pressures. Such high temperatures aggravate corrosion of conventional distillation equipment.

According to the present invention, phosphorus oxyhalide is reacted with a phenol in the presence of activated clay. The reaction is carried out by employing an amount of the phenol which is at least equal to the stoichiometric amount required for reaction with phosphorus oxyhalide, and desirably an excess of about 300% over and above this stoichiometric amount. The amount of activated clay utilized as the catalyst is not critical although it is preferred to utilize an amount sufficient to provide a thin slurry in order to insure adequate contact surface for the reactants. Such an amount will generally range from about 5% to 20% by weight of the phosphorus oxyhalide to be added.

In commencing the reaction, the phenol and activated clay are charged into a suitable vessel and gently heated to about 60° C. The phosphorus oxyhalide is then slowly added to the slurry, generally over a period of from 1 to 4 hours. Simultaneously, the temperature is slowly increased to from about 70° C. to 100° C. The addition time is principally a function of the temperature; that is, at a higher temperature, the addition rate of the oxyhalide may be increased. The heating is continued after the phosphorus oxyhalide addition, and the temperature is slowly raised to from about 130° C. to 200° C. in order to promote the liberation of hydrogen chloride. When the evolution of hydrogen halide is no longer detectable, generally after about 4 hours, the heating is stopped, and the reaction mass is filtered to remove the activated clay from the crude reaction product. The crude product is thereafter purified by fractional distillation and washing, yielding substantially pure triarylphosphate in good yield. If desirable, the residue may be recycled to the reaction vessel in order to minimize losses.

The phenol used is a hydroxybenzene such as phenol itself; cresols; xylenols; mixtures thereof, including mixtures containing phenols and cresols, phenols and xylenols, cresols and xylenols, and all three of these phenols, particularly the so-called cresylic acid which is a mixture of various homologs and isomers of cresol, usually containing meta and para cresol, low-boiling xylenols, and some phenols having ethyl substituents; m-butyl phenol; other alkyl phenols in which the alkyl groups each contain from 1 to 4 carbon atoms; and mixtures of such thereafter purified by fractional distillation and washphenols. The phenol used should preferably be substantially anhydrous, i.e., contain less than about 0.1% moisture. Examples of products thus formed include triphenyl phosphates, tricresyl phosphates, trixylenyl phosphates, other trialkylphenyl phosphates, and the like.

In general the active clay material should be low in free water, since if from about 400–500 p.p.m., based on the reaction mixture, of free water is present in the system the process cannot go to completion or is greatly inhibited unless additional, otherwise unnecessary, catalyst is employed. Thus the active clay should be dried at a temperature of from about 212 to 220° F. for a period of several hours if it contains excessive free moisture, but in no event should the active clay be heated to a temperature sufficiently high to drive off the water of hydration or combined water, since the active clay is reduced to a substantially inert material, insofar as the instant process is concerned, by such processing.

The suitable active clays are those of natural origin such as fuller's earth, and those that can be made active by processing such as by acid treatment. These active clays are characterized by the presence therein of replaceable bases. The substantially non-swelling type of bentonites can be readily activated by well known prior art methods, as for example, by making an aqueous slurry thereof to which a small amount of sulfuric acid is added and thereafter agitating the mixture at a temperature of from about 212 to about 220° F. for a period of from about 2 to about 12 hours, and then drying the composition and reducing same to a powder. The principal constitutents of fuller's earth are montmorillonite and attapulgite, and of bentonite are montmorillonite and beidellite. Other suitable montmorillonite-type active clay minerals are for example nortronite, saponite, and hectorite. Various hydrated aluminum silicates of the kaolinite type may also be employed, such as, kaolinite, dickite, nacrite, anauxite, halloysite, and endellite. The activated bentonites are the preferred active clay materials and can be obtained under various trade names. Some examples of activated clays available commercially include Superfiltrol, Pikes Peak clay, Sud-Chemie, various fuller's earths, such as 237 SW, Fulmont 500, Fulmont 711, Fulmont 800, and the like.

The manner of carrying out the process of this invention, and the excellent results achieved therefrom, will be further apparent from the following examples, in which all parts and percentages are by weight unless otherwise specified.

EXAMPLE 1

A suitable reaction vessel is charged with 170 grams (1.65 mols) of cresol and 10 grams of Sud-Chemie acid treated clay. The slurry thus formed is heated to 70° C., and, during a period of approximately 2½ hours, 76.7 grams (0.5 mol) of phosphorus oxychloride is slowly added thereto while the temperature is raised to 100° C. The reaction mixture is thereafter heated for an additional 4 hours, after which the evolution of hydrogen chloride formed during the reaction is no longer detectable. During this latter heating period, the temperature is further increased to approximately 130° C. in order to assist the liberation of the hydrogen chloride gas. The reaction mixture is thereafter filtered to remove the clay catalyst. The crude reaction product is then fractionally distilled and washed with water, yielding 162.0 grams of tricresyl phosphate as a substantially clear liquid. Analysis shows 8.5% phosphorus as against a calculated value of 8.4% for $C_{21}H_{21}PO_4$, with 0.028% residual chlorine.

EXAMPLE 2

The procedure set forth in Example 1 is substantially repeated utilizing 351.2 grams of cresylic acid (a mixture of various homologs and isomers of cresol), 18.3 grams of acid-treated Sud-Chemie clay, and 138.2 grams of phosphorus oxychloride. The addition of phosphorus oxychloride is strated at 60° C., and the addition thereof consumes about 150 minutes, during which time the temperature is slowly increased to 174° C. Thereafter, the temperature is slowly increased to from 200° C. to 220° C. and held there for about 24 hours. After filtration, fractional distillation and washing with water, there is obtained 294.2 grams of tricresyl phosphate, or 94.1% theoretical, based on the charged cresylic acid.

EXAMPLE 3

The procedure set forth in Example 1 is repeated substituting 150.4 grams (1.6 mols) of phenol for the cresol and 12 grams Superfiltrol acid activated clay for the Sud-Chemie clay. There is obtained triphenyl phosphate in good yield and purity.

EXAMPLE 4

The procedure set forth in Example 1 is repeated substituting 143.4 grams (0.5 mol) of phosphorus oxybromide for the phosphorus oxychloride, 240 grams (1.6 mol) of p-tert.-butylphenol for the cresol, and 7 grams of Superfiltrol acid activated clay. There is obtained tri-p-tert.-butylphenyl phosphate in good yield.

While this invention has been described with respect to certain embodiments, it is not so limited, and it is understood that variations and modifications thereof obvious to those skilled in the art may be made without departing from the spirit or scope of this invention.

The embodiments of the invention in which an exclusive property or privilege is claimed are defined as follows:

1. In a process for the prepartion of triarylphosphates which comprises reacting a hydroxybenzene selected from the group consisting of phenol, alkyl phenols in which said alkyl group has from 1 to 4 carbon atoms, mixtures of said phenol and alkyl phenols, and mixtures of said alkyl phenols, with a phosphorus oxyhalide selected from the group consisting of phosphorus oxychloride and phosphorus oxybromide, the improvement comprising conducting the said reaction in the presence of acid activated clay of the montmorillonite type.

2. The process according to claim 1 wherein said acid activated clay is an acid activated non-swelling bentonite.

3. The process according to claim 2 wherein there is present from about 5% to 15% by weight of activated clay, based on the charged phosphorus oxyhalide.

4. The process according to claim 3 wherein said hydroxybenzene is cresylic acid.

5. A process according to claim 4 wherein said phosphorus oxyhalide is phosphorus oxychloride.

References Cited

UNITED STATES PATENTS 2,870,192   1/1959   Bonstedt _____ 260—975

CHARLES B. PARKER, Primary Examiner

A. H. SUTTO, Assistant Examiner

U.S. Cl. X.R.

252—49.8; 260—30.6, 966